UNITED STATES PATENT OFFICE 2,416,238

5-NITRO-2-FURALDEHYDE SEMIOXAMAZONE

William B. Stillman and Albert B. Scott, Norwich, N. Y., assignors, by mesne assignments, to Eaton Laboratories, Inc., Norwich, N. Y., a corporation of New York No Drawing. Original application August 28, 1945, Serial No. 613,205. Divided and this application October 25, 1946, Serial No. 705,795

1 Claim. (Cl. 260—345)

This invention relates to a new chemical compound, 5-nitro-2-furaldehyde semioxamazone, described by the formula:

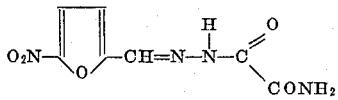

We have made the discovery that this new compound, while sharing the antiseptic properties which are common to many nitrofurans, is distinguished from most other nitrofurans by its effectiveness against infections when administered orally. In doses well below the toxic limit, it has proved highly effective in the treatment of streptococcus and trypanosome infections, and is a valuable chemotherapeutic agent.

The new compound is made as follows:

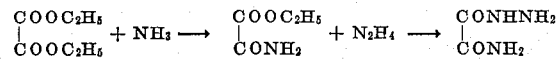

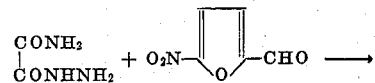

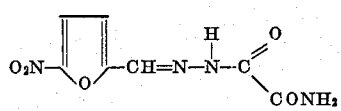

Oxalic ester amide is prepared from ethyl oxalate according to the directions of Weddigo, J. Prakt. Chem., (2), 10, 196 (1874). Semioxamazide is then prepared from this product by the method of Kerp and Unger, Ber. 30, 586 (1897). To a solution of 7 g. of the latter compound in hot water, is added, slowly with stirring, 9.55 g. of nitrofurfural in ethanol. The mixture is allowed to cool and the tan solid is removed by filtration. Purification is effected by suspending the product in warm dioxane, then allowing the mixture to cool. The solid is again removed by filtration. It is light yellow, microcrystalline, weighs 11.6 g. (76%); M. P. 250°; solubility in water, 1:200,000.

This application is a division of our application Serial No. 613,205, filed August 28, 1945, as a continuation-in-part of our applications filed May 17, 1944, and bearing Serial Nos. 536,046, 536,047 and 536,048.

What is claimed is:

5-nitro-2-furaldehyde semioxamazone represented by the formula:

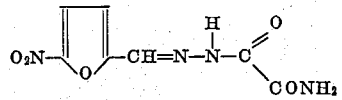

WILLIAM B. STILLMAN.
ALBERT B. SCOTT.